UNITED STATES PATENT OFFICE.

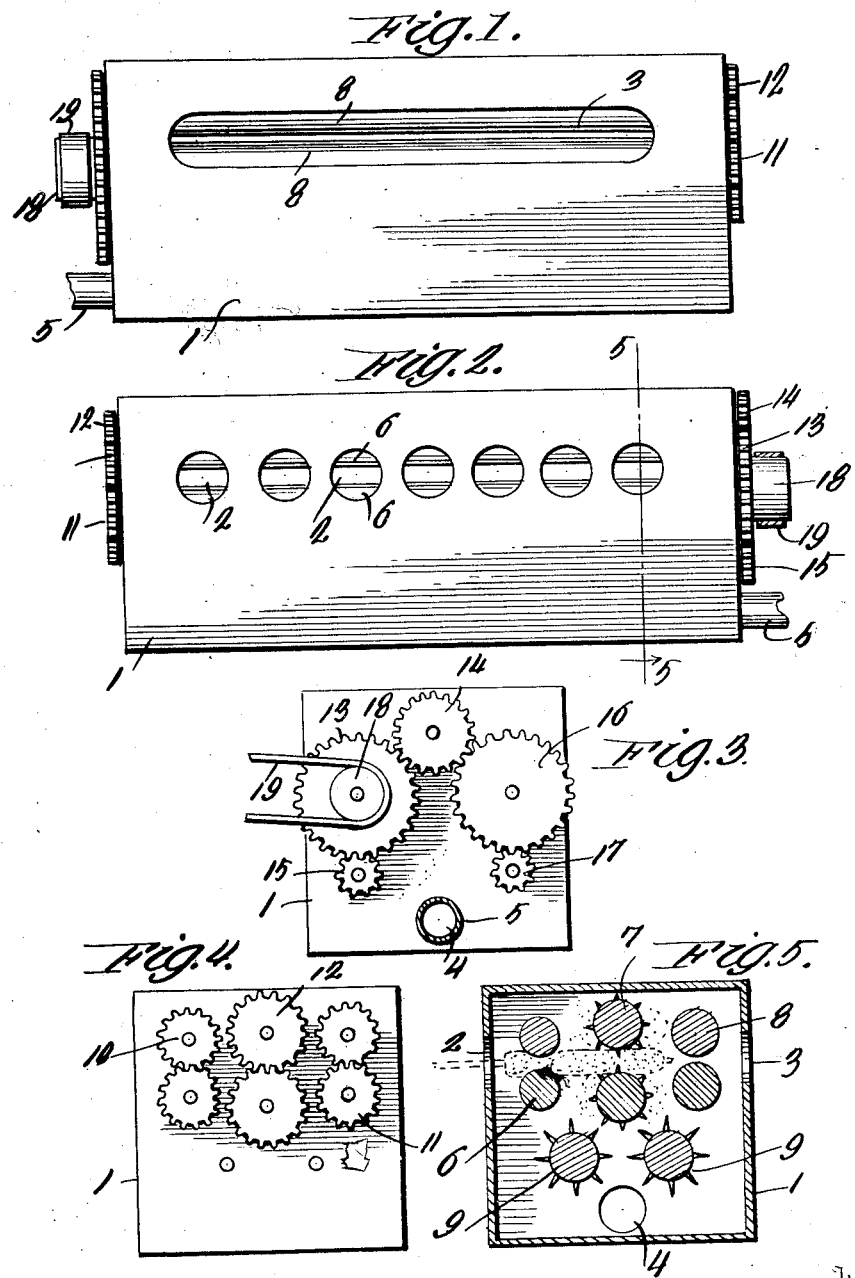

PETER F. ECKROAT, OF ORANGE, CALIFORNIA.

STRIPPING MECHANISM.

1,357,087.	Specification of Letters Patent.	Patented Oct. 26, 1920.

Application filed September 25, 1919. Serial No. 326,197.

*To all whom it may concern:*

Be it known that I, PETER F. ECKROAT, a citizen of the United States, residing at Orange, in the county of Orange and State of California, have invented certain new and useful Improvements in Stripping Mechanism, of which the following is a specification.

It is well known that the floss or down obtained from the *Typha latifolia* commonly known as cattails is of a light and fluffy nature and for this reason has not been put to any extensive commercial use because of the difficulty experienced in controlling the material when stripped from the stem. By experiment I have determined and ascertained that this floss or down may be used as a filling for mattresses and upholstering generally, hence I have devised a machine particularly adapted for stripping the floss or down from the stems and delivering the same at any determinate point of discharge.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the accompanying drawings:

Figure 1 is a rear view of a stripping mechanism embodying the invention,

Fig. 2 is a front view thereof,

Figs. 3 and 4 are obverse and reverse end views of the machine, and

Fig. 5 is a section on the line 5—5 of Fig. 2 looking to the right, as indicated by the arrow.

Corresponding and like parts are referred to in the following description and indicated in the several views of the drawings by like reference characters.

The machine comprises a casing 1 which is preferably of box form. A plurality of openings 2 is formed in the front of the casing. A single elongated opening 3 is formed in the rear of the casing. The openings 2 receive the spikes, as indicated most clearly by the dotted lines in Fig. 5, whereas the opening 3 provides a discharge for the stems or spikes when divested of the floss or down. A discharge opening 4 is provided in one end of the casing and a pipe 5 connects therewith for conveying the floss or down to the required point of discharge.

The mechanism for removing the floss or down from the stems or spikes is located within the casing 1 and comprises a plurality of rollers. A pair of crushing rollers 6 is located opposite the feed openings 2 and the spikes of the plant are fed through the openings 2 and between the crushing rollers 6 which loosen the floss or down by a crushing action. In the rear of the crushing rollers 6 is located a pair of stripping rollers 7 which are toothed and serve to remove the floss or down from the stems. A pair of delivery rollers 8 is located in the rear of the stripping rollers and opposite the delivery opening 3. The delivery rollers 8 effect positive discharge of the spikes or stems through the discharge opening 3. Fluffing rollers 9 are located below the crushing, stripping and delivery rollers and act to loosen and lighten the down or floss as the same is stripped from the spikes or stems and prior to its delivery through the discharge opening 4.

In practice, a suction fan, not shown, is located in the length of the delivery pipe 5 to draw the material from the machine and effect delivery thereof at the required point of discharge. The crushing rollers 6 are connected at one end by gearing 10. The delivery rollers are connected at one end by gearing 11. Since the gear wheels 10 and 11 are of like diameter, the crushing rollers and the delivery rollers are rotated at a uniform speed. The stripping rollers 7 are connected at one end by gearing 12. The several sets of rollers are connected at one end by gearing which is shown most clearly in Fig. 3. A gear wheel 13 is secured to the projecting journal of the lower crushing roller 6 and meshes with gear wheels 14 and 15. The gear wheel 14 is an idler and meshes with a gear wheel 16 secured to the journal of the lower delivery roller 8. The gear wheel 15 is of less diameter than the gear wheel 13 and is secured to the journal of one of the fluffing rollers 9. The other fluffing roller 9 has a gear wheel 17 secured to its journal and which meshes with the gear wheel 16. A drive pulley 18 is connected with the gear wheel 13 so as to rotate therewith and is adapted to be driven from a suitable source of power by means of a drive belt 19. By the intermeshing of the several gear wheels, as shown most clearly in Fig. 3, the several rollers are connected for simultaneous action. The stripping rollers 7 are driven at a higher rate of speed than the crushing and delivery rollers and the fluffing rollers 9 are likewise driven at a higher rate of speed. The spikes of *Typha latifolia*, or cattails are fed into the machine through the openings 2, as indicated by the dotted lines in Fig. 5 and pass between the crushing rollers, the stripping rollers and the delivery rollers in successive order, the stems being discharged through the delivery opening 3. The floss or down removed by the rollers 7 after being loosened by the crushing rollers 6 is acted upon by the fluffing rollers 9 and is drawn through the discharge opening 4 and delivered through the pipe 5 to the required point of discharge in a manner well understood.

Having thus fully described my invention, what I claim as new and desire to secure by Letters Patent, is:—

1. In a stripping machine of the character specified, a casing provided with oppositely disposed feed and discharge openings, coöperating crushing, stripping and delivery rollers disposed within the casing in line with the said openings, and fluffing rollers located below the crushing, stripping and delivery rollers for lightening the material preliminary to its discharge from the casing.

2. A stripping machine for the spikes of the *Typha latifolia* plant comprising a casing having a discharge opening for the floss or down, a feed opening for receiving the spikes and a delivery opening for the discharge of the stems, pairs of crushing, stripping and delivery rollers arranged within the casing in line with the feed and delivery openings, fluffing rollers located below the crushing, stripping and delivery rollers and about in line with the spaces formed between the several sets of rollers, and means for operating the stripping and fluffing rollers at a higher rate of speed than the crushing and delivery rollers.

In testimony whereof 1 affix my signature in presence of two witnesses.

PETER F. ECKROAT.

Witnesses:
  E. C. WHITNEY,
  F. A. DUTTON.